United States Patent [19]
Kohl

[11] 3,753,682

[45] Aug. 21, 1973

[54] PORTED ROTARY KILN PROCESS FOR DIRECT REDUCTION OF OXIDES OF METALLIC MINERALS

[75] Inventor: Robert F. Kohl, Shorewood, Wis.

[73] Assignee: Allis-Chalmers Manufacturing Company, Milwaukee, Wis.

[22] Filed: Sept. 18, 1970

[21] Appl. No.: 73,389

[52] U.S. Cl............................ 75/3, 75/26, 75/34, 75/36
[51] Int. Cl...... C21b 1/08, C21b 1/02, C21b 13/14
[58] Field of Search........................... 75/2–6, 75/26, 34, 36, 37; 263/33

[56] References Cited
UNITED STATES PATENTS

| | | | |
|---|---|---|---|
| 3,094,409 | 6/1963 | Renzoni | 75/9 |
| 3,231,366 | 1/1966 | Schenck | 75/26 |
| 2,144,914 | 1/1939 | Debuch | 75/21 |
| 3,331,679 | 7/1967 | Schenck | 75/34 |
| 2,792,298 | 5/1957 | Freeman | 75/3 |
| 1,829,438 | 10/1931 | Coley | 75/36 |
| 3,206,299 | 9/1965 | Senior | 75/36 |
| 2,107,549 | 2/1938 | Schmalfeldt | 75/36 |
| 3,113,859 | 12/1963 | Moklebust | 75/6 |
| 1,555,078 | 9/1925 | Robertson | 75/6 |
| 3,029,141 | 4/1962 | Sibakin | 266/33 |

*Primary Examiner*—L. Dewayne Rutledge
*Assistant Examiner*—Peter D. Rosenberg
*Attorney*—Arthur M. Streich, Robert B. Benson and John P. Hines

[57] ABSTRACT

A process is disclosed for prereducing metallic oxide and sulfide ores to a lower state of oxidation without passing through a liquid phase, at an accelerated rate. The ore particles are preheated to 1,800° or above. An unreformed hydrocarbon fuel such as natural gas ($CH_4$) substantially free of any oxidizing agents is passed into a bed of such preheated ore particles to pyrolytically decompose and reform portions of the fuel into strong reducing agents while in intimate contact with the oxidic metal to be reduced. Such forming of reducing agents cause at least some ore to very quickly reduce to a lower state of oxidation with an attendant solid state reorientation of metal and/or sulfur and oxygen atoms. The atomic reorientation provides increased porosity, and greater surface area is exposed to the strong reducing agents for additional and continued reduction. Portions of as yet unreformed fuel in the bed are rapidly reformed by continued pyrolysis and by reacting with oxygen and/or sulfur from the ore, to provide additional quantities of strong reducing agents.

8 Claims, 2 Drawing Figures

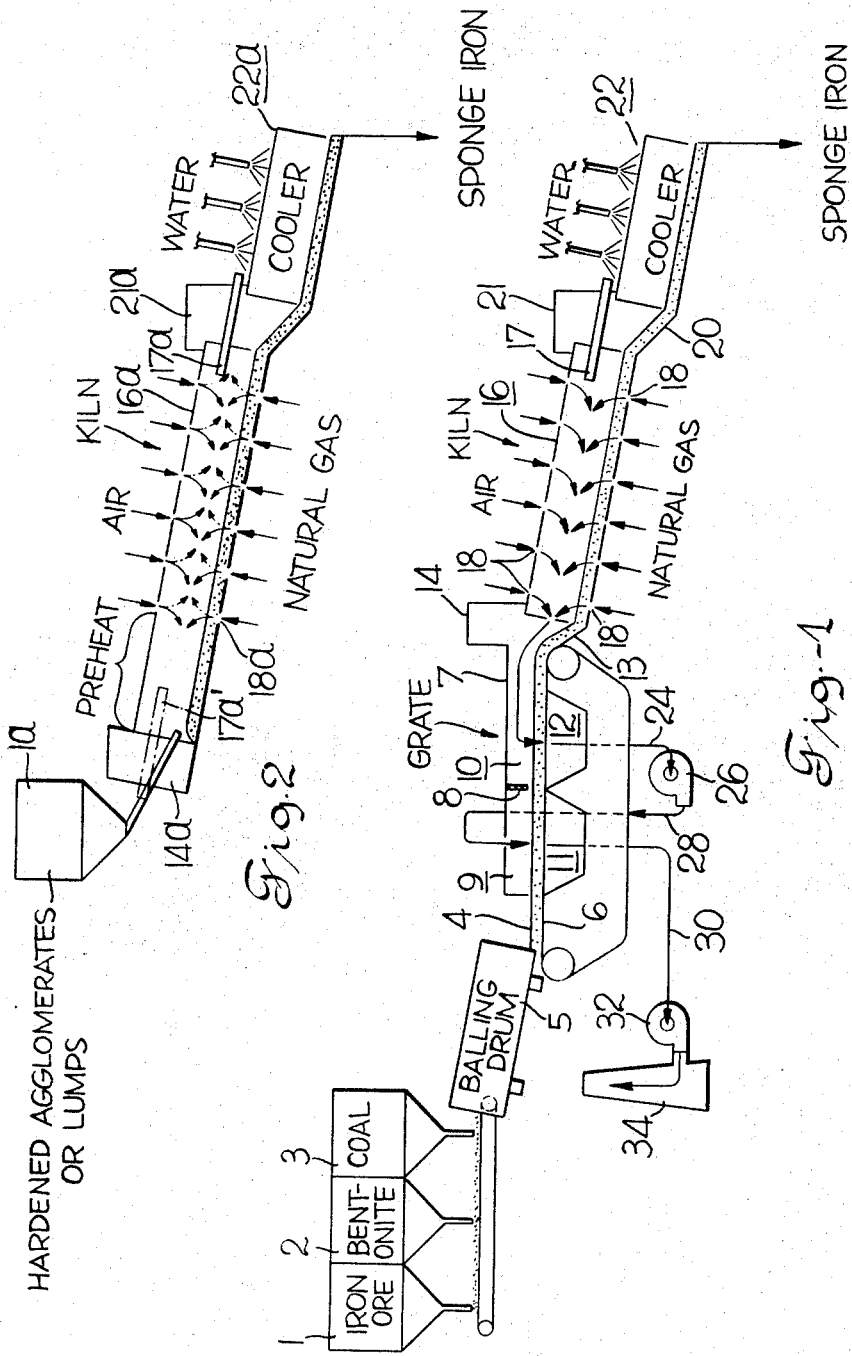

3,753,682

PORTED ROTARY KILN PROCESS FOR DIRECT REDUCTION OF OXIDES OF METALLIC MINERALS

BACKGROUND OF THE INVENTION

1. Field of the Invention

This invention relates to a process for producing a strong degradation resistant particle of mineral ore of increased metal content. In particular, this invention relates to a ported kiln process for prereduction of mineral ore which means it relates to a controlled admission of hydrocarbon fuel and oxidizing gases into a rotary kiln for an oxygen reducing treatment not intended to produce liquid metal but rather the intent is to increase the metallized content of a particle or agglomerate in the generally solid state by reducing the oxygen content, in order to provide a pretreated charge material having increased utility in chemical processes requiring a mineral in metallic form or that will increase the capacity and fuel efficiency of subsequent smelting and refining processes.

2. Description of the Prior Art

The history of the development of processes and machines for achieving prereduction of mineral ores, according to the meaning that has been attributed to the word "prereduction" in the foregoing definition of the "Field of the Invention," is related primarily to reducing the oxygen content of oxide iron ores. While some commercial production of such a prereduced iron ore product has been carried on at least since the development of the system described in U.S. Pat. No. 1,401,222, granted to F. M. Wiberg in 1919, more recent developments have occurred which are reviewed in the Journal of Metals for July, 1966, beginning at page 795 in an article entitled "Prereduced Iron Ore Pellets, State of the Art" by N. B. Melcher and M. M. Fine. During the time interval since this article was written no apparatus or process has emerged as an entirely acceptable solution for the long sought goal of lowering hot metal cost by prereduction. Therefore, although many systems have demonstrated that iron pellets can be prereduced, a better process for producing such pellets in required quantities at a cost that reduces the final cost of marketable metal remains unsolved. One of the systems described in the aforementioned article as having been developed by the Allis-Chalmers Manufacturing Company, is therein described as involving a traveling grate for drying and partial hardening balls of iron ore concentrate and coke, followed by a special ported kiln having two concentric cylinders. This system is the subject of a T. G. Kirkland U.S. Pat. No. 3,068,091, granted Dec. 11, 1962. Thus prior art related to prereduction has suggested utilization of a traveling grate and a ported rotary kiln combination in a system which, as stated in the aforementioned article, has merit at least where small tonnages of highly reduced products are required.

Reference will now be made to the Kirkland patent, certain early work at the U.S. Bureau of Mines that will be hereinafter described, and a later U.S. Pat. No. 3,182,980 of 1965 to W. J. Helfrich who was a colleague of Kirkland familiar with the Kirkland patent, as a discussion such references will facilitate an explanation of the present invention. Kirkland not only suggested utilization of a traveling grate and ported kiln, but Kirkland also teaches the desirability of utilizing reducing gases produced by decomposing and reforming a hydrocarbon fuel into reducing gases, in the prereduction process-equipment itself, rather than by utilizing gases from a fuel reformer system apart from the prereduction process-equipment or by purchasing reducing gases from commercial gas suppliers. Kirkland and others have long considered natural gas, i.e., methane $CH_4$, as a suitably low cost hydrocarbon fuel available in sufficient quantities, and therefore a prime candidate for utilization in a prereduction system. It has been long known however that natural gas is itself such a poor reductant that it is not considered to be a reducing gas by those skilled in this art. This was established by an extensive series of investigations during 1931, 1932 and 1933 at the U.S. Bureau of Mines station in Berkeley, California during an investigation of what was known as the Maier process. During the 1931-1933 tests of the U.S. Bureau of Mines at Berkeley, California, the charge ore and natural gas were brought together with air at 1,000° C (i.e., 1,832° F) but that it was then discovered that the charge ore near the air-gas inlets often fused and that an amount of natural gas did not decompose and reform until after a large part of the iron ore had been reduced. For such reasons attention shifted to decomposing and reforming natural gas into reducing gases in a separate unit utilizing a nickel catalyst to reform the methane-natural gas. Kirkland however taught that oxide ore to be reduced could itself be a catalyst if the ore is first dried and preheated to 600° F and then is brought in contact with hydrocarbon fuel by passing the fuel over the ore charge in a chamber that has been preheated to about 1,200° F, after which oxidizing gases are admitted through peripheral ports in the kiln to provide the combustion needed to raise the temperature of the ore, the reformed gases and the unreformed fuel from the 600° to 1,200° F level, to about 1,900° to 1,950° F.

Helfrich, who was familiar with the Kirkland teaching, suggested an innovation to the Kirkland teaching by which the admission of hydrocarbon fuel is through ports in the kiln periphery as the ports pass beneath the bed of ore in the kiln, while at the same time admitting oxidizing gases through ports passing over the bed of ore. According to the teaching of the Helfrich U.S. Pat. No. 3,182,980, before the hydrocarbon fuel is passed upwardly through the bed of ore, the ore charge is preheated to reduction temperature, which according to Kirkland begins at about 1,200° F. A pilot kiln was constructed and operated as described in the Helfrich patent with the preheat carried to temperatures as high as 1,800° F followed by the under bed admission of hydrocarbon fuel for reforming and then ore reduction at several different steady state reaction temperatures which in one test was below the 1,800° F preheat temperature (1,650° to 1,750° F), in another test was at the preheat temperature (1,800° F), and in still another test was above the 1,800° F preheat temperature (2,000° F). Reduction was achieved but not at reduction levels nor retention times achieved by the Kirkland system, as described in the July 1966 Journal of Metals, until the present invention, which will be hereinafter described, was conceived and applied thereto.

An explanation of three other ported kiln systems known to the prior art, will perhaps aid in achieving an understanding of the present invention which will thereafter be described. Reference is made here to a ported kiln and system described in a 1961 Rouaux U.S. U.S. Pat. No. 3,011,772; a 1962 Sibakin et al. U.S.

Pat. No. 3,029,141; and a ported kiln and system in operation at the Krivorozhsky complex in the USSR as described in a paper by G. V. Gubin et al. published at the VIII International Mineral Processing Congress, Leningrad 1968.

The 1961 patent to Rouaux suggests admitting through peripheral kiln ports a mix of reducing gases and oxygen providing an ore reducing atmosphere with sufficient partial combustion to raise the temperature of the ore to over 2,000° F. Although the Rouaux apparatus does provide for the mix of reducing gases and oxygen to be adjusted, this Rouaux kiln is not operative in the manner of the Helfrich kiln to admit hydrocarbon fuel only beneath the ore and oxidizing gases only over the ore bed, and Rouaux teaches maintaining the ends of his kiln, including the end thereof in which the ore is preheated, as cold as possible without causing a dew point to be reached.

The 1962 patent to Sibakin suggests preheating of the ore on a traveling grate and in an unported kiln section to over 2,000° F before the ore reaches a ported kiln section, and Sibakin suggests supplying hydrocarbon fuel in the form of oil or gas to the ore through the ports. However, Sibakin like Rouaux, provides valves on a ported kiln for admitting through peripheral kiln ports a mix of combustible gas and oxidizing gas which can be adjusted but cannot be operated in the manner of the Helfrich kiln to admit combustible gas only beneath the ore and oxidizing gas only over the ore.

The 1968 Russian publication describes a kiln having ports and nozzles which like those disclosed in the 1965 Helfrich patent begin to supply a hydrocarbon fuel to the ore as the ports enter the ore bed and cease upon leaving the ore bed. This operation however provides for heating the ore to only 750°–800° C (1,382°–1,472° F) and no prereduction of the ore to metallic iron is achieved. The operation so described is, as described in the publication, a magnetic roast for reducing oxidized quartzites to magnetite, hematite, iron silicates and a very small amount (i.e., less than 1 percent) of wustite.

SUMMARY OF THE INVENTION

The present invention involves a discovery that when metallic oxide and sulfide ores are preheated to 1,800° F or above and present as a bed of ore particles at that temperature, and then an unreformed hydrocarbon fuel, such as natural gas, substantially free of any oxidizing gases is passed into the bed to make initial and immediate contact with ore at 1,800° F or above, that a very high percentage of the fuel is very quickly pyrolytically decomposed and reformed into strong reducing agents while in intimate contact with the oxidic metal ore to be reduced. Such forming of reducing agents cause at least some ore to very quickly reduce to a lower state of oxidation with an attendant solid state reorientation of metal and/or sulfur and oxygen atoms. The atomic reorientation provides increased porosity, and greater surface area is exposed to the strong reducing agents for additional and continued reduction. Portions of as yet unreformed fuel in the bed are rapidly reformed by continued pyrolysis and by reacting with oxygen and/or sulfur from the ore, to provide additional quantities of strong reducing agents.

In a preferred practice of the present invention, ore is utilized that has been prepared as fines, and powdered coal may be mixed with the ore fines to reduce fuel requirements later in the process. As applied to iron ore, the process involves preheating the iron ore to 2,000° F, the fines of the ore, and coal if mixed therewith, may be made into hardened agglomerates in any one of several ways. Agglomerates of fines may be hardened without heat by adding a small amount of cement. The fines may also be formed into waterbound agglomerates which are heat hardened with the traveling grate and rotary kiln apparatus shown in U.S. Pat. No. 2,925,336; or, fines may be formed into waterbound agglomerates which are hardened by treatment on only such as the traveling grate preheater shown in U.S. Pat. No. 2,925,336 and utilizing heat from the later stages of heat processing according to this invention. After the agglomerates are given sufficient strength to withstand tumbling, the agglomerates are established as bed, preheated to about 2,000° F, in a ported rotary kiln. As a bed of the 2,000° F agglomerates moves axially in the kiln, ports in the periphery of the kiln pass beneath the bed of agglomerates and natural gas fuel substantially free of any oxidizing gases is passed through the ports and into the bed of agglomerates to make initial and immediate contact with the 2,000° F agglomerates. The contact of such fuel with the agglomerates of oxide iron ore at such a high temperature causes a portion of the fuel to quickly pyrolytically decompose and reform an amount thereof as strong reducing agents (carbon and hydrogen) while in intimate contact with the oxidic iron ore to be reduced. Such forming of the reducing agents cause at least some iron ore to very quickly reduce to a lower state of oxidation with an attendant solid state reorientation of iron and oxygen molecules. The molecular reorientation provides increased porosity, and greater surface area of oxidic iron is exposed to the strong reducing agents for additional and continued reduction. Portions of as yet unreformed fuel in the bed are rapidly reformed by continued pyrolysis (to provide carbon and hydrogen) and by reacting with oxygen from the ore (to provide carbon monoxide), to thereby provide additional quantities of strong reducing agents (which at this point in the process are carbon, hydrogen and carbon monoxide). The production of strong reducing agents and the prereduction of the iron oxide directly to metallic iron proceeds in the bed of agglomerates advancing through the kiln until 90 percent or more of the iron that is contained within the agglomerates appears in its metallic (not oxide) state. The agglomerates are then discharged to such as an indirect cooler which cools the agglomerates in a nonoxidizing atmosphere to prevent reoxidation of the agglomerates.

It is an important feature of the present invention that a hydrocarbon fuel, such as methane, free of oxidizing gases, is caused to make an initial and immediate contact with the ore particles in a bed at 1,800° F or above, and in a manner providing continuous operation.

A more detailed description of the preferred embodiment of the present invention, as well as more important features thereof, will follow with reference to the accompanying drawings.

BRIEF DESCRIPTION OF THE DRAWINGS

FIG. 1 of the accompanying drawing shows diagrammatically a side elevation, partly in section, an apparatus for practicing a process according to the present invention; and FIG. 2 shows diagrammatically a side elevation of other apparatus for practicing the process.

DESCRIPTION OF THE PREFERRED EMBODIMENT

Referring to FIG. 1 of the drawing, finely divided iron ore and coal along with bentonite from hoppers 1, 2 and 3 are mixed and rolled into suitable agglomerates 4 by such as a balling drum 5 which may be of the type shown in U.S. Pat. Nos. 1,994,718 and 2,411,873. The balling drum 5 is arranged to discharge to gas pervious traveling grate 6 enclosed by a housing 7. The housing 7 has a baffle wall 8 projecting downwardly from the roof of housing 7 to a predetermined distance above the grate 6. The baffle wall 8 divides the space enclosed by housing 7 over grate 6 into a drying chamber 9 and a preheat chamber 10. Windboxes 11 and 12 are arranged beneath chambers 9 and 10. A chute 13 with a hood 14 connects the grate 6 to a rotary kiln 16. The kiln 16 has an axial burner 17 and peripheral ports 18. The kiln 16 may be of the type described in the previously mentioned Helfrich U.S. Pat. No. 3,182,980. A second chute 20 with a hood 21 that also serves as the firing hood for kiln 16, connects kiln 16 to an indirect water cooled cooler 22 which may be of the type shown in U.S. Pat. No. 2,792,298.

The agglomerates 4 which are formed in balling drum 5 are formed into a bed, with individual agglomerates at rest relative to each other, and the bed is transported by grate 6 through the housing 7 to the chute 13. At the chute 13 the bed of agglomerates is disrupted and the agglomerates are discharged into kiln 16. The agglomerates 4 are tumbled through the kiln 16 to the chute 20 which discharges the agglomerates to the cooler 22. Agglomerates 4 are discharged from cooler 22 to conveying means (not shown) for transport as may be desired.

A gas flow through kiln 16 proceeds counterflow to the movement of the agglomerates 4 through kiln 16. The gas flow results from fuel and air admitted to kiln 16 through the axial burner 17 and peripheral ports 18. The gas flow proceeds, counterflow to agglomerates 4, from kiln 16 through hood 14 to the preheat chamber 10 where the gases are drawn downwardly through the bed of agglomerates 4, through grate 6, through wind box 12, and through a conduit 24 by a fan 26. Fan 26 discharges the gases drawn outwardly through the bed of agglomerates 4 in preheat chamber 10, into a conduit 28 that discharges the gases into the drying chamber 9 over grate 6. The gases in chamber 9 are drawn downwardly through the bed of agglomerates 4, through grate 6, through wind box 11, and through a conduit 30 by a fan 32 which discharges the gases up a stack 34.

A method will now be described for operating the described apparatus of FIG. 1 to perform the process of the present invention. By way of example, the operation and process will be described as applied to processing a hematite iron ore ($Fe_2O_3$) into pellets, i.e., ball shaped agglomerates, of approximately 90 percent metallization.

The iron ore may be prepared for the process by mixing the ore with coal, if desired, in amounts up to 20 percent or more and agglomerating finely divided particles into balls (pellets), which may be desired to be about + ⅜ inch − ¾ inch, in drum 5 as described in the previously referred to U.S. Pat. Nos. 1,994,718 and 2,411,873. The pellets of iron ore and coal are gathered into a first gas permeable body of pellets on grate 6 in chamber 9. Individual pellets are at rest relative to each other within this moving body on grate 6. The pellets in chamber 9 are dried by gases at 500° to 900° F passing from conduit 28 downwardly through the bed of pellets on grate 6 in chamber 9 and into wind box 11. Grate 6 carries the bed of pellets into and through chamber 10 where the pellets are preheated by gases from kiln 16.

Preheating the pellets in chamber 10 to temperatures above 1,600° F may cause grain growth bridges as shown in FIGS. 4 and 5 of U.S. Pat. No. 2,925,336. If the process is practiced with coal having been mixed with the ore, reduction of the ore in agglomerates 4 to wustite FeO will begin to take place in chamber 10.

Having reached the level of strength and degradation resistance required to withstand tumbling in a kiln, the body of pellets on grate 6 is disrupted by discharging the pellets down chute 13 and into kiln 16. As the pellets tumble down the incline of chute 13, and into and through the first part of kiln 16, they become exposed to reducing gases hot enough to insure the balls being heated to about 2,000° F before arriving at the first of the ports 18 through which a hydrocarbon fuel such as natural gas, substantially free of oxidizing gases, is admitted to the bed of agglomerates 4 tumbling in kiln 16.

As the bed of the 2,000° F agglomerates 4 moves axially in the kiln 16, ports 18 in the periphery of the kiln 16 pass beneath the bed of agglomerates 4 and natural gas substantially free of any oxidizing gases is passed through the ports and into the bed of agglomerates to make initial and immediate contact with the 2,000° F agglomerates. The contact of such gases with the agglomerates of oxide iron at such a high temperature causes a portion of the gas to quickly pyrolytically decompose and reform an amount thereof as strong reducing agents, i.e., carbon and hydrogen.

The pyrolysis of methane is a reaction of thermal decomposition. The decomposition products are carbon and hydrogen. The mechanism of the thermal decomposition of methane has not been well understood. The most probable steps of reactions may be represented by the following reactions (a) through (d):

a. $CH_4 \rightarrow CH_3 + H$ (Initiation)
b. $CH_3 + CH_4 \rightarrow C_2H_6 + H$ (Propagation)
c. $H + CH_4 \rightarrow CH_3 + H_2$ (Propagation)
d. $CH_3 \rightarrow C + 3/2\ H_2$ (Termination)

The degree of decomposition of methane is a function of temperature. The following Table I of test data shows the relationship to the thermodynamic equilibrium.

TABLE I

| TEMPERATURE, °F | 1070°F | 1700°F | 2150°F |
|---|---|---|---|
| % Decomposition | 53% | 97% | 99% |

But, as has been hereinbefore related, during the Bureau of Mines tests of 1931–1933 it was discovered that an amount of natural gas fuel (methane) did not decompose and reform until after a large part of the iron had been reduced and that attention was therefore caused to shift to decomposing and reforming natural gas into reducing agents in a separate apparatus using a nickel catalyst.

That the foregoing reported difficulty does not arise with the present invention is perhaps best explained by the following Table II of test data which shows that the degree of decomposition of fuel (methane) per unit of time is even more remarkably a function of temperature.

TABLE II

| Temp. °F | 1922°F | 2012°F | 2102°F | 2192°F | 2282°F |
|---|---|---|---|---|---|
| % Decomposition | 10% | 30% | 65% | 85% | 95% |

In the process of this invention the thermal (pyrolytic) decomposition of the fuel may be considered as taking place "on site" because it occurs in intimate contact with oxidic ore which has been preheated to 2,000° F or more. Thus the present process teaches a different concept than the previously mentioned prior process in which fuel and ore are brought together at substantially lower temperatures and then together raised in temperatures. Because of such "on site" 2,000° F pyrolysis the decomposition occurs rapidly and the decomposition products, i.e., carbon and hydrogen, react immediately with oxygen from the mineral oxide ore to reduce the ore while any remaining methane continues to pyrolytically decompose or be reformed by a partial combustion reaction which may be represented by the following reaction (e):

e. $CH_4 + 1/2\ O_2 \rightarrow CO + H_2$

Such forming of the reducing agents as has been described, cause at least some iron ore to very quickly reduce to a lower state of oxidation with an attendant solid state reorientation of iron and oxygen atoms. The atomic reorientation provides increased porosity, and greater surface area of oxidic iron is exposed to the strong reducing agents for additional and continued reduction. Portions of as yet unreformed fuel in the bed are rapidly reformed by continued pyrolysis according to reactions (a) through (d) to provide carbon and hydrogen, by reacting with oxygen from the ore to provide carbon monoxide, and by reacting with any gaseous oxygen that may be present in the bed, according to reaction (e), to thereby provide additional quantities of strong reducing agents (which at this point in the process then are carbon, hydrogen and carbon monoxide). The production of strong reducing gases and the prereduction of the iron oxide directly to metallic iron proceeds in the bed of agglomerates advancing through the kiln until 90 percent or more of the iron that is contained within the agglomerates appears in its metallic (not oxide) state. The agglomerates are then discharged to the indirect cooler 22 which cools the agglomerates in a nonoxidizing atmosphere to prevent reoxidation of the agglomerates.

The agglomerates can be discharged from the nonoxidizing atmosphere of the cooler without reoxidizing a significant amount of the now metallic iron.

Referring to FIG. 2 an apparatus is shown such as may be used to process prehardened agglomerates of fines or lump ore. For such feed material a hopper 1a feeds through a hood 14a into the upper end of a ported rotary kiln 16a. The kiln 16a may be provided with an axial burner 17a projecting into the material discharge end of the kiln, in which case an exhaust fan (not shown) may be provided to draw gases out of hood 14a. Or, the kiln may be provided with an axial burner 17a' projecting into the material feed end of the kiln, in which case an exhaust fan (not shown) may be provided to draw gases out of hood 21a. The kiln 16a is provided with an unported preheat section, so labeled in FIG. 2, on the material feed end of kiln 16a, and a second kiln section adjacent the preheat section is provided with peripheral ports 18a. This kiln may also be of the type described in the previously mentioned Helfrich U.S. Pat. No. 3,182,980. The kiln 16a may discharge to an indirect cooler 22a which also may be of the type shown in U.S. Pat. No. 2,792,298.

A method with variations will now be described for operating the described apparatus according to FIG. 2 to perform the process of the present invention. With this apparatus lump ore may be fed to kiln 16a, or agglomerates of fines (with or without added coal) with a small amount of cement (about 5 percent) added may be cold hardened and then fed to kiln 16a, or agglomerates previously heat hardened by such systems as are disclosed in U.S. Pat. Nos. 2,750,272; 2,750,273; 2,750,274 or 2,925,336; may be fed to kiln 16a. With heat supplied either by a burner 17a or a burner 17a', the feed material is preheated in the preheat section of kiln 16a to about 2,000° F before arriving at the first of the ports 18a. From then on the process proceeds in kiln 16a in the same manner as has been described with regard to kiln 16 of FIG. 1.

The foregoing description of the present invention according to either FIG. 1 or FIG. 2 may therefore incorporate an addition of coal to the ore before pellets are formed. This invention is a fluid or gas fuel process and coal (i.e., nongassified coal) need be used only as dictated by economics, that is, the desirability of producing needed temperatures as cheaply as possible is a goal, and adding coal may help achieve that goal.

The foregoing description also indicated a preference for utilizing natural gas - methane $CH_4$ as the hydrocarbon fuel injected into the bed of 2,000° F agglomerates. The invention is meant however to encompass the use of other hydrocarbon fuels such as propane, butane, naphtha and fuel oil. Liquid hydrocarbons would of course vaporize at the temperatures involved in this process, and therefore act in much the same manner within the bed of agglomerates 4 as the gaseous hydrocarbon fuels.

It is, of course, understood that oxidic iron ore has been described above to illustrate rather than limit the process of the present invention and its principles are equally applicable to the oxidic or sulfide ores of tungsten, nickel, zinc, manganese, chrome and phosphorus. In addition, certain higher grade oxidic ores of copper may also be reduced with this process. With regard to sulfide ores, those skilled in this art understand that reducing any metallic ore to a lower state of oxidation does not necessarily involve the removal of an oxygen atom from the ore as is the case with an oxidic ore (e.g., $Fe_2O_3 \rightarrow FeO$), but that any metallic ore reducing involves a change in valence of the metallic atom such as in the following reactions:

$Fe_2O_3 \rightarrow FeO \rightarrow Fe$
$Fe^{+++} \rightarrow Fe^{++} \rightarrow Fe^°$
and
$FeS \rightarrow Fe$
$Fe^{++} \rightarrow Fe^°$ The present invention has been proven operable to reduce both metallic oxidic ore and sulfide ore in the manner described.

From the foregoing detailed description of a preferred embodiment of apparatus and process steps according to the present invention, it has been shown how the features of the invention have been attained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. A process for directly reducing metal bearing materials selected from the group consisting of oxide and sulfide materials, without melting of the said materials, the said oxide materials being reduced to a metallization of 90 percent or more and the sulfide materials being reduced to a lower state of oxidation, with said reduction being achieved in a generally horizontal rotary kiln, comprising the steps of:

a. heating a charge of lumps or agglomerates of fines of material selected from the group consisting of the oxides and sulfides of iron, tungsten, nickel, zinc, copper, manganese, chrome and phosphorus, to at least a temperature level of about 1,800° to 2,000° F, and then;
   b. charging the lumps or agglomerates thus heated to a zone in said kiln provided with porting means spaced around the circumference thereof and opening into the interior of the kiln and with the material forming a porous gas previous bed of masses in said zone;
   c. rotating the kiln about a central axis therethrough to move the porting means around the central axis to pass beneath and over the bed;
   d. admitting oxidizing gas through the porting means into the zone only while the porting means are over the bed to provide an oxidizing atmosphere over the bed;
   e. admitting fluid hydrocarbon fuel substantially free of oxidizing gases through the porting means only when the porting means are beneath the bed; and
   f. heating the hydrocarbon fuel by directing it to pass radially inward from the porting means through the bed and in contact with the 1,800° to 2,000° F material in the bed to provide an initial pyrolytic dissociation of a portion of the fluid hydrocarbon fuel into carbon and hydrogen while in intimate contact with the material to quickly reduce at least a portion of the material to a lower state of oxidation with attendant surface area increasing solid state reorientation of mineral and oxygen molecules providing for continuing reduction of material and reformation of the fuel by continued pyrolysis of the fuel to provide carbon and hydrogen and a reaction of the fuel with the material to provide carbon monoxide, to thereby provide quantities of carbon, hydrogen and carbon monoxide in intimate contact with molecules in the material, for rapidly reducing the material ore to metallic form without a liquid phase.

2. A process according to claim 1 in which the charge of lumps or agglomerates is heated to at least a temperature level of about 1,922° to 2,000° F before being charged to the kiln zone provided with porting means.

3. A process according to claim 1 in which the charge of lumps or agglomerates is prepared to include particles of solid carbonaceous material; and during the heating of the charge before being charged to the ported zone, carbonaceous material within the charge is oxidized by reacting with the lumps or agglomerates of material to partially reduce the lumps or agglomerates before being charged to the ported zone.

4. A process for directly reducing iron oxide ore without melting to a metalization of 90 percent or more in a generally horizontal rotary kiln, comprising the steps of:

a. heating a charge of lumps or agglomerates of fines of iron oxide ore to at least a temperature level of about 1,800° to 2,000° F, and then;
   b. charging the lumps or agglomerates thus heated to a zone in said kiln provided with porting means spaced around the circumference thereof and opening into the interior of the kiln and with the ore forming a porous gas pervious bed of masses in said zone;
   c. rotating the kiln about a central axis therethrough to move the porting means around the central axis to pass beneath and over the bed;
   d. admitting oxidizing gas through the porting means into the zone only while the porting means are over the bed to provide an oxidizing atmosphere over the bed;
   e. admitting fluid hydrocarbon fuel substantially free of oxidizing gases through the porting means only when the porting means are beneath the bed; and
   f. heating the fuel by directing it to pass upwardly from the porting means through the bed and in contact with the 1,800° to 2,000° F porous masses of ore in the bed to provide an initial pyrolytic dissociation of a portion of the fuel into carbon and hydrogen, while in intimate contact with the iron oxide ore to quickly reduce at least a portion of the iron oxide ore to a lower state of oxidation with attendant surface area increasing solid state reorientation of iron and oxygen molecules providing for continuing reduction of the ore and reformation of the fuel by continued pyrolysis of the fuel to provide carbon and hydrogen and combustion of the fuel with oxygen from the ore to provide carbon monoxide, to thereby provide quantities of carbon, hydrogen and carbon monoxide in intimate contact with iron molecules in the oxidic iron ore, for rapidly prereducing the oxidic iron ore metallic iron without a liquid phase.

5. A process according to claim 4 in which the charge of lumps or agglomerates is heated to at least a temperature level of about 1,922° to 2,000° F before being charged to the kiln zone provided with porting means.

6. A process according to claim 5 in which the charge of lumps or agglomerates is prepared to include particles of solid carbon, and during the heating of the lumps or agglomerates, carbon within the agglomerates is oxidized by combining with oxygen from the ore to reduce at least some of the iron ore to wustite FeO before being charged to the kiln zone provided with porting means.

7. A process according to claim 4 in which the charge of lumps or agglomerates is heated to about 2,000° F before being charged to the kiln zone provided with porting means.

8. A process according to claim 6 preceded by drying and at least the preheating of the lumps or agglomerates to temperatures at least above 1,600° F by forming the lumps or agglomerates into a bed on a traveling grate with individual agglomerates at rest relative to each other, and passing gases from the kiln through the bed on the grate to reduce at least some of the iron ore to wüstite FeO while the lumps or agglomerates are in the bed on the traveling grate.

* * * * *